United States Patent
Hori et al.

(10) Patent No.: US 9,598,320 B2
(45) Date of Patent: Mar. 21, 2017

(54) METHOD OF PRODUCING COMPOSITE METAL OXIDE, METAL OXIDE SINTERED BODY, AND ROTARY KILN

(75) Inventors: Naomichi Hori, Chigasaki (JP); Mikio Nakashima, Chigasaki (JP)

(73) Assignee: TOHO MATERIAL CO., LTD., Chigasaki-shi (JP)

(*) Notice: Subject to any disclaimer, the term of this patent is extended or adjusted under 35 U.S.C. 154(b) by 628 days.

(21) Appl. No.: 14/110,734

(22) PCT Filed: Apr. 19, 2012

(86) PCT No.: PCT/JP2012/060561
§ 371 (c)(1),
(2), (4) Date: Nov. 14, 2013

(87) PCT Pub. No.: WO2012/144553
PCT Pub. Date: Oct. 26, 2012

(65) Prior Publication Data
US 2014/0065565 A1 Mar. 6, 2014

(30) Foreign Application Priority Data

Apr. 22, 2011 (JP) ................. 2011-096093

(51) Int. Cl.
C04B 35/46 (2006.01)
C04B 35/50 (2006.01)
C01G 23/00 (2006.01)
C01G 25/00 (2006.01)
F27B 7/28 (2006.01)
F27B 7/20 (2006.01)
F27D 1/00 (2006.01)

(52) U.S. Cl.
CPC ............ *C04B 35/50* (2013.01); *C01G 23/005* (2013.01); *C01G 25/006* (2013.01); *F27B 7/20* (2013.01); *F27B 7/28* (2013.01); *F27D 1/0006* (2013.01)

(58) Field of Classification Search
CPC ... C04B 35/10; C04B 35/1015; C04B 35/106; C04B 35/111; C04B 35/117; C04B 35/119; C04B 35/50
See application file for complete search history.

(56) References Cited

U.S. PATENT DOCUMENTS

2011/0065005 A1  3/2011  Kumagai et al.

FOREIGN PATENT DOCUMENTS

| CN | 101117457 A | 2/2008 |
|---|---|---|
| JP | 61-270256 A | 11/1986 |
| JP | 09-259881 A | 10/1997 |
| JP | 2003-146658 A | 5/2003 |
| JP | 2003-165767 A | 6/2003 |
| JP | 2004-063261 A | 2/2004 |
| JP | 2005-314170 A | 11/2005 |
| JP | 2008-103100 A | 5/2008 |
| JP | 2009-292704 A | 12/2009 |
| JP | 2011-058785 A | 3/2011 |

OTHER PUBLICATIONS

Machine translation JP 61270256 Nov. 1986.*
English translation of Chinese Office Action dated Sep. 2, 2014, issued in Chinese Application No. 2012800174197, (4 pages).
Chinese Office Action dated Sep. 2, 2014, issued in corresponding CN Application No. 201280017419.7 (4 pages).
International Search Report dated Jul. 24, 2012, issued in corresponding application No. PCT/JP2012/060561.

* cited by examiner

Primary Examiner — Karl Group
(74) Attorney, Agent, or Firm — Westerman, Hattori, Daniels & Adrian, LLP

(57) ABSTRACT

Provided is a method of producing a composite metal oxide including, to calcine a composition containing an alkali metal and obtain a composite metal oxide, calcining the composition while being arranged on a mount a part of which in contact with the composition is formed of a metal oxide component. The metal oxide component has a content of K atoms ranging from 5 to 13 parts by weight in terms of $K_2O$ with respect to 100 parts by weight of the metal oxide component, and a total content of Al atoms, Zr atoms, Mg atoms, and Ce atoms ranging from 15 to 70 parts by weight in terms of oxides with respect to 100 parts by weight of the metal oxide component. The present invention thus provides a method of producing a composite metal oxide containing an alkali metal with reduced production costs.

6 Claims, No Drawings

METHOD OF PRODUCING COMPOSITE METAL OXIDE, METAL OXIDE SINTERED BODY, AND ROTARY KILN

TECHNICAL FIELD

The present invention relates to a method of producing a composite metal oxide containing an alkali metal. The present invention also relates to a novel metal oxide sintered body and a rotary kiln using the same.

BACKGROUND ART

Alkali metal-containing composite metal oxides are useful compounds. For example, lithium composite metal oxides are used for electrodes for lithium-ion secondary batteries, and potassium composite metal oxides are used for friction materials. For example, lithium-cobalt composite oxides, lithium-nickel composite oxides, lithium-manganese composite oxides, lithium-manganese-cobalt composite oxides, and lithium-nickel-cobalt composite oxides are used as positive electrode active materials of lithium-ion secondary batteries. For example, lithium titanate composite oxides are used as negative electrode active materials. For example, $K_2O \cdot 6(TiO_2)$ and $K_2O \cdot 8(TiO_2)$ are used for friction materials.

These alkali metal-containing composite metal oxides are produced by putting powder of a production raw material for producing an alkali metal-containing composite metal oxide into a calcining member such as a sagger or a crucible (setter) for calcining. In general, alumina, magnesia, zirconia, mullite, cordierite, and the like are used for calcining members. It is necessary, however, to select a calcining member having low reactivity and high durability because alkali metals are corrosive. For example, JP-A-2004-63261 (Patent Document 1) discloses a refractory for calcining made of alumina, mullite, and/or cordierite, which contains lithium and cobalt, in which the lithium content is 2 to 5% by mass and the cobalt content is 2 to 5% by mass.

JP-A-2003-146658 (Patent Document 2) discloses a method of producing a composite oxide, in which a sheet material made of a material to be carbonized is sandwiched between a container and a calcining raw material powder to perform calcining.

RELATED-ART DOCUMENTS

Patent Documents

Patent Document 1: JP-A-2004-63261 (claims)
Patent Document 2: JP-A-2003-146658 (claims)

SUMMARY OF THE INVENTION

Problems to be Solved by the Invention

The calcining members such as alumina, magnesia, zirconia, mullite, and cordierite do not have sufficient corrosion resistance against alkali metals. After an alkali metal-containing composite metal oxide is calcined, the generated alkali metal-containing composite metal oxide adheres to the calcining member because of poor releasability of the alkali metal-containing composite metal oxide from the calcining member.

The alkali metal-containing composite metal oxide adhering to the calcining member cannot be used as a product, thereby reducing the yield of products. When the conventional calcining member is subjected to repeated use, the alkali metal-containing composite metal oxide is more likely to adhere. With more repeated use of the calcining member, the yield of products is reduced.

Moreover, the conventional calcining member has low resistance to thermal shock and is broken as a result of repeated use. The durability in repeated use is thus low.

Based on the foregoing, the conventional method of producing an alkali metal-containing composite metal oxide has a problem in that the production costs of the alkali metal-containing composite metal oxide are high.

In the case where a sheet material to be carbonized during calcining is sandwiched between a calcining raw material for an alkali metal-containing composite metal oxide and a refractory in order to prevent adhesion of the alkali metal-containing composite metal oxide to the calcining member, continuous calcining of the production raw material, for example, calcining in a rotary kiln is impossible, and the production efficiency cannot be improved.

An object of the present invention is therefore to provide a method of producing a composite metal oxide, in which when a calcining raw material composition for a composite metal oxide containing an alkali metal is calcined, the composite metal oxide containing an alkali metal after calcining is less likely to adhere to a calcining member, and the durability of the calcining member is increased, whereby the production costs are reduced. Another object of the present invention is to provide a method of producing a composite metal oxide with increased production efficiency.

Means for Solving the Problems

The inventors of the present invention conducted extensive studies in such a situation. As a result, the inventors found that a metal oxide component having a content of K atoms within a particular range and having a total content of Al atoms, Zr atoms, Mg atoms, and Ce atoms within a particular range has less adhesion of an alkali metal-containing composite metal oxide generated during calcining and has high resistance to thermal shock and thus high durability in repeated use. This finding has led to the completion of the invention.

(1) The invention provides a method of producing a composite metal oxide including, to calcine a composition containing an alkali metal and obtain a composite metal oxide, calcining the composition while being arranged on a mount a part of which in contact with the composition is formed of a metal oxide component. The metal oxide component has a content of K atoms ranging from 5 to 13 parts by weight in terms of $K_2O$ with respect to 100 parts by weight of the metal oxide component, and a total content of Al atoms, Zr atoms, Mg atoms, and Ce atoms ranging from 15 to 70 parts by weight in terms of oxides with respect to 100 parts by weight of the metal oxide component.

(2) The invention provides a metal oxide sintered body obtained by sintering a raw material that contains a potassium-containing composite metal oxide and one or more kinds of compounds selected from an aluminum compound, a zirconium compound, a magnesium compound, and a cerium compound. The metal oxide sintered body has a content of K atoms ranging from 5 to 13 parts by weight in terms of $K_2O$ with respect to 100 parts by weight of the metal oxide sintered body, a total content of Al atoms, Zr atoms, Mg atoms, and Ce atoms ranging from 15 to 70 parts by weight in terms of oxides with respect to 100 parts by weight of the metal oxide sintered body, and a Vickers hardness of 260 or more.

(3) The invention provides a rotary kiln including a retort whose inner wall contains the metal oxide sintered body according to the invention (2).

Effects of the Invention

The present invention can reduce production costs because a composite metal oxide containing an alkali metal after calcining is less likely to adhere to the mount, and the durability of the mount is increased. Furthermore, the present invention provides a method of producing a composite metal oxide with increased production efficiency.

DESCRIPTION OF EXEMPLARY EMBODIMENTS

A method of producing a composite metal oxide according to the present invention includes, to calcine a composition containing an alkali metal and obtain a composite metal oxide, calcining the composition while being arranged on a mount a part of which in contact with the composition is formed of a metal oxide component. The metal oxide component has a content of K atoms ranging from 5 to 13 parts by weight in terms of $K_2O$ with respect to 100 parts by weight of the metal oxide component, and a total content of Al atoms, Zr atoms, Mg atoms, and Ce atoms ranging from 15 to 70 parts by weight in terms of oxides with respect to 100 parts by weight of the metal oxide component.

In the following, the composite metal oxide obtained by the method of producing a composite metal oxide according to the present invention is also referred to as "composite metal oxide A". A potassium-containing composite metal oxide that is a production raw material for producing the metal oxide component that is in contact with the composition containing an alkali metal (a calcining raw material for the composite metal oxide A) is also referred to as "potassium-containing composite metal oxide B".

In the method of producing a composite metal oxide according to the present invention, to calcine a composition containing an alkali metal that is a raw material for a composite metal oxide, calcining is performed by arranging a metal oxide component on a part in contact with the composition containing an alkali metal that is a calcining raw material. The metal oxide component has a content of K atoms ranging from 5 to 13 parts by weight in terms of $K_2O$ with respect to 100 parts by weight of the metal oxide component, and a total content of Al atoms, Zr atoms, Mg atoms, and Ce atoms ranging from 15 to 70 parts by weight in terms of oxides with respect to 100 parts by weight of the metal oxide component.

The composition containing an alkali metal (hereinafter also referred to as the calcining raw material) in the method of producing a composite metal oxide according to the present invention is a raw material for producing the composite metal oxide A and contains an alkali metal compound. The alkali metal compound contained in the calcining raw material is a raw material compound serving as a source of the alkali metal of the composite metal oxide A and is a compound having an alkali metal atom. Examples of the alkali metal for the calcining raw material include lithium, sodium, potassium, and rubidium. Among these, lithium, sodium, and potassium are preferred, and lithium and potassium are particularly preferred. Examples of the alkali metal compound for the calcining raw material include oxides, halides (chlorides, bromides, iodides), hydroxides, carbonates, nitrates, sulfates, and oxalates of the alkali metals for the calcining raw material, and composite metal oxides having alkali metal atoms for the calcining raw material, for example, a transition metal oxide containing an alkali metal. The alkali metal compounds for the calcining raw material may be used singly, or two or more may be combined.

The calcining raw material may be a pre-calcinated product obtained by pre-calcinating the calcining raw material at a temperature lower than the calcining temperature.

An example of the calcining raw material is a composite metal oxide having the same chemical composition as that of the composite metal oxide A generated by calcining. In the following, the composite metal oxide as a calcining raw material that has the same chemical composition as that of the composite metal oxide A generated by calcining is also referred to as a composite metal oxide C. In the method of producing a composite metal oxide according to the present invention, the composite metal oxide C having the same chemical composition as that of the composite metal oxide A generated by calcining is used as a calcining raw material in order to change the physical properties such as crystallinity, corrosion resistance, abrasion resistance, calcine resistance, and heat resistance of the composite metal oxide C that is a calcining raw material, by means of calcining, and to produce the composite metal oxide A having physical properties different from those of the composite metal oxide C. For example, in the method of producing a composite metal oxide according to the present invention, calcining is performed using a calcining raw material having a chemical composition of $K_2O.6\,(TiO_2)$ (composite metal oxide C) whereby the physical properties can be changed to $K_2O.6\,(TiO_2)$ (composite metal oxide A) having higher crystallinity than $K_2O.6\,(TiO_2)$ before calcining (composite metal oxide C).

The composition containing an alkali metal in the method of producing a composite metal oxide according to the present invention contains, in addition to an alkali metal compound, a transition metal compound, a magnesium compound, an aluminum compound, and a silicon compound as appropriate depending on the kind of composite metal oxide A. The transition metal compound contained in the composition containing an alkali metal is a raw material compound serving as a source of a transition metal of the composite metal oxide A and is a compound having a transition metal atom. The magnesium compound contained in the composition containing an alkali metal is a raw material compound serving as a source of magnesium of the composite metal oxide A and is a compound having a magnesium atom. The aluminum compound contained in the composition containing an alkali metal is a raw material compound serving as a source of aluminum of the composite metal oxide A and is a compound having an aluminum atom. The silicon compound contained in the composition containing an alkali metal is a raw material compound serving as a source of silicon of the composite metal oxide A and is a compound having a silicon atom. Examples of the transition metal atom for the composition containing an alkali metal include cobalt, iron, nickel, manganese, chromium, scandium, titanium, vanadium, yttrium, zirconium, and niobium. Among these, cobalt, iron, nickel, manganese, and titanium are preferred, and titanium is particularly preferred. Examples of the transition metal compound, the magnesium compound, the aluminum compound, and the silicon compound for the composition containing an alkali metal include oxides, halides (chlorides, bromides, iodides), hydroxides, carbonates, nitrates, sulfates, and oxalates of transition metals, magnesium, aluminum, and silicon for the composition containing an alkali metal. The transition metal compound, the magnesium compound, the aluminum compound, and the silicon compound for the composition containing an alkali metal may be used singly, or two or more may be combined. The composition containing an alkali metal may contain another metal compound in addition to the alkali metal compound, the transition metal compound, the magnesium compound, the aluminum compound, and the silicon compound. The combination of raw material compounds in the composition containing an alkali metal may be selected as appropriate depending on what composite metal compound A is produced.

In the method of producing a composite metal oxide according to the present invention, first, predetermined amounts in weight of an alkali metal compound and, depending on the kind of composite metal oxide A, a raw material compound other than the alkali metal compound, such as a transition metal compound, a magnesium compound, an aluminum compound, and a silicon compound, are measured. The measured raw material compounds are mixed and, if necessary, formed to obtain a composition containing an alkali metal (calcining raw material). The obtained composition containing an alkali metal (calcining raw material) is then arranged on a mount and calcined in a predetermined atmosphere at a predetermined temperature for a predetermined time to obtain the composite metal oxide A. The calcining atmosphere in which the composition containing an alkali metal is calcined is selected as appropriate depending on the kind of composition containing an alkali metal. Examples of the calcining atmosphere include oxidizing atmospheres such as oxygen gas and air, and inert gas atmospheres such as nitrogen gas and argon gas. The calcining temperature for calcining the composition containing an alkali metal is selected as appropriate, for example, from a temperature range of about 600 to 1500° C. depending on the kind of composition containing an alkali metal or composite metal oxide A. Other calcining conditions are also set as appropriate depending on the kind of composition containing an alkali metal or composite metal oxide A. For example, the temperature increase rate is selected as appropriate from a range of 4.5° C./min to 200° C./min, and the calcining time is selected as appropriate from a range of 20 minutes to 5 hours.

For example, the calcining temperature for the composition containing an alkali metal is 600° C. or higher when the composite metal oxide A is a lithium-cobalt composite oxide (for example, $LiCoO_2$, $LiCo_{1-x-y}Mg_xAl_yO_2$), a lithium-nickel composite oxide (for example, $LiNiO_2$, $LiNi_{1-x}Co_xO_2$, $LiNi_{1-x-y}Co_xAl_yO_2$, $LiNi_{1-x-y}Co_xMn_yO_2$), a lithium-manganese composite oxide (for example, $LiMn_2O_4$, $LiMn_{2-x}Cr_xO_4$, $LiMn_{2-x}Al_xO_4$, $LiMn_{2-x}Ni_xO_4$), or a lithium-titanium composite oxide (for example, $Li_4Ti_5O_{12}$). The calcining temperature is 1000° C. or higher when the composite metal oxide A is a lithium-lanthanum-zirconium composite oxide (for example, $Li_{7+x}La_3Zr_2O_{12+(x/2)}$ (−5<x<3)) or a lithium-lanthanum-titanium composite oxide (for example, $Li_xLa_{(2-x)/3}TiO_3$ (x=0.1 to 0.5). The calcining temperature is 1000° C. or higher when the composite metal oxide A is $K_2O.n$ $(TiO_2)$ (n=4 to 8) (for example, $K_2O.4$ $(TiO_2)$, $K_2O.6$ $(TiO_2)$, $K_2O.8$ $(TiO_2)$). Based on this, the calcining temperature is preferably 600° C. or higher. However, the calcining temperature is not limited thereto.

The composite metal oxide A produced by the method of producing a composite metal oxide according to the present invention is a composite metal oxide containing an alkali metal. Examples of the composite metal oxide A include: lithium-cobalt composite oxides (for example, $LiCoO_2$, $LiCo_{1-x-y}Mg_xAl_yO_2$); lithium-nickel composite oxides (for example, $LiNiO_2$, $LiNi_{1-x}Co_xO_2$, $LiNi_{1-x-y}Co_xAl_yO_2$, $LiNi_{1-x-y}Co_xMn_yO_2$); lithium-manganese composite oxides (for example, $LiMn_2O_4$, $LiMn_{2-x}Cr_xO_4$, $LiMn_{2-x}Al_xO_4$, $LiMn_{2-x}Ni_xO_4$); lithium-titanium composite oxides (for example, $Li_4Ti_5O_{12}$); lithium-lanthanum-zirconium composite oxides (for example, $Li_{7+x}La_3Zr_2O_{12+(x/2)}$ (−5<x<3); lithium-lanthanum-titanium composite oxides (for example, $Li_xLa_{(2-x)/3}TiO_3$ (0.1≤x≤0.5)); $K_2O.n$ $(TiO_2)$ (4≤n≤8) (for example, $K_2O.4$ $(TiO_2)$, $K_2O.6$ $(TiO_2)$, $K_2O.8$ $(TiO_2)$); lithium-lanthanum-hafnium composite oxides (for example, $Li_7La_3Hf_2O_{12}$); lithium-phosphorus composite oxides (for example, $Li_xMPO_4$ (M is at least one kind of element selected from the group consisting of Mn, Fe, Co, and Ni), $Li_xVPO_4F$ (0≤x≤1)); $Li_{1+x}M_xTi_{2-x}$ $(PO_4)_3$ (M is at least one kind of element selected from the group consisting of Al, Y, Ga, In, and La, 0≤x≤0.6)); NASICON-type composite oxides (for example, $LiTi_2$ $(PO_4)_3$, $LiZr_2$ $(PO_4)_3$, $LiGe_2$ $(PO_4)_3$), β-$Fe_2$ $(SO_4)$-type $Li_3M_2$ $(PO_4)_3$ (M is a hetero element such as In and Sc)); and lithium-lanthanum-titanium-phosphorous composite oxides.

The mount in the method of producing a composite metal oxide according to the present invention is a part of a sintering tool or a calcining furnace that is in contact with the composition containing an alkali metal that is a raw material for the composite metal oxide A, during calcining Examples of the mount include a crucible, a sagger, a setter, a reaction tube, a furnace inner wall, sintering sand, and a tool for suspending a formed body of the composition.

The mount in the method of producing a composite metal oxide according to the present invention is a mount a part of which in contact with the composition containing an alkali metal is formed of a metal oxide component having a particular composition. The metal oxide component that forms the part of the mount in contact with the calcining raw material is hereinafter also referred to as the metal oxide component according to the present invention.

The metal oxide component according to the present invention is a metal oxide component having a content of K atoms ranging from 5 to 13 parts by weight in terms of $K_2O$ with respect to 100 parts by weight of the metal oxide component, and a total content of Al atoms, Zr atoms, Mg atoms, and Ce atoms ranging from 15 to 70 parts by weight in terms of oxides with respect to 100 parts by weight of the metal oxide component.

The metal oxide component according to the present invention has a content of K atoms ranging from 5 to 13 parts by weight, preferably 7 to 13 parts by weight, in terms of $K_2O$ with respect to 100 parts by weight of the metal oxide component. Setting the content of K atoms in the metal oxide component according to the present invention within these ranges can prevent the composite metal oxide A generated during calcining from adhering to the mount (metal oxide component) and increase the number of times of repeated use of the mount. In addition, the strength and the abrasion resistance of the mount (metal oxide component) can be increased. The content of potassium atoms in terms of $K_2O$ refers to the content of $K_2O$ with respect to 100 parts by weight of the metal oxide component according to the present invention, assuming that all the potassium atoms in the metal oxide component according to the present invention are present in the state of $K_2O$ (this is also applicable to the metal oxide sintered body according to the present invention as described later).

The metal oxide component according to the present invention has a total content of Al atoms, Zr atoms, Mg atoms, and Ce atoms ranging from 15 to 70 parts by weight, preferably 25 to 48 parts by weight, in terms of oxides with respect to 100 parts by weight of the metal oxide component according to the present invention. Setting the total content of Al atoms, Zr atoms, Mg atoms, and Ce atoms in the metal oxide component according to the present invention within these ranges can prevent the composite metal oxide A generated during calcining from adhering to the mount (metal oxide component) and increase the number of times of repeated use of the mount. In addition, the strength and the abrasion resistance of the mount can be increased. The total content of Al atoms, Zr atoms, Mg atoms, and Ce atoms in terms of oxides refers to the total content of $Al_2O_3$, $ZrO_2$, MgO, and $CeO_2$ with respect to 100 parts by weight of the metal oxide component according to the present invention, assuming that, for all the Al atoms, Zr atoms, Mg atoms, and Ce atoms in the metal oxide component according to the present invention, the Al atoms are present in the form of $Al_2O_3$, the Zr atoms are present in the form of $ZrO_2$, the Mg atoms are present in the form of MgO, and the Ce atoms are present in the form of $CeO_2$ (this is also applicable to the metal oxide sintered body according to the present invention as described later).

The metal oxide component according to the present invention contains the potassium-containing composite metal oxide B and an oxide of one or more kinds selected from Al, Zr, Mg, and Ce or a composite metal oxide of two or more kinds selected from Al, Zr, Mg, and Ce, in terms of oxides in the above-noted amounts, thereby preventing the composite metal oxide A generated during calcining from adhering to the mount (metal oxide component). It is thus possible to increase the number of times of repeated use of the mount, to increase the durability of the mount, and to increase the abrasion resistance and the strength of the mount.

The metal oxide component according to the present invention preferably has a Vickers hardness of 260 or more. Setting the Vickers hardness of the metal oxide component according to the present invention within this range can prevent the alkali metal-containing composite metal oxide A generated during calcining from adhering to the mount (metal oxide component) and increase the number of times of repeated use of the mount. In addition, the strength and the abrasion resistance of the mount can be increased. The metal oxide component according to the present invention preferably has an amount of blast abrasion of 18% or less. Setting the Vickers hardness and the amount of blast abrasion of the metal oxide component according to the present invention within these ranges can prevent the alkali metal-containing composite metal oxide A generated during calcining from adhering to the mount (metal oxide component) and increase the number of times of repeated use of the mount. In addition, the strength and the abrasion resistance of the mount can be increased. The amount of blast abrasion of the metal oxide component according to the present invention refers to the weight reduction ratio due to impact of blowing that is obtained when alumina 0.3-mm grains are blown onto the surface of the metal oxide component at a pressure of 0.5 MPa for one minute. Accordingly, the amount of blast abrasion of the metal oxide component according to the present invention is represented by $(\Delta W/Wa) \times 100(\%)$ where Wa (g) is the weight before blast and $\Delta W$ is the amount of abrasion after blast (the amount of weight reduction) (g).

In the method of producing a composite metal oxide according to the present invention, the metal oxide component that is in contact with the composition containing an alkali metal (the metal oxide component according to the present invention) is preferably a metal oxide sintered body formed by sintering a plurality of metal oxides. An example of the metal oxide sintered body suitably used as the metal oxide component according to the present invention is the following metal oxide sintered body according to the present invention.

The metal oxide sintered body according to the present invention is obtained by sintering a raw material (hereinafter also referred to as a sintered body raw material) that contains the potassium-containing composite metal oxide B and one or more kinds of compounds selected from an aluminum compound, a zirconium compound, a magnesium compound, and a cerium compound.

The potassium-containing composite metal oxide B contained in the sintered body raw material is not limited as long as it is a composite metal oxide having a potassium atom. Examples of the potassium-containing composite metal oxide B include $K_2O \cdot n(TiO_2)$ (n is 4 to 8), more specifically, $K_2O \cdot 4(TiO_2)$, $K_2O \cdot 6(TiO_2)$, and $K_2O \cdot 8(TiO_2)$. Other examples of the potassium-containing composite metal oxide B include $K_{0.8}Ti_{1.6}Mg_{0.4}O_4$, $K_{0.8}Ti_{1.6}Ni_{0.4}O_4$, $K_{0.8}Ti_{1.2}Fe_{0.8}O_4$, and $K_{0.8}Ti_{1.2}Mn_{0.8}O_4$. The purity of the potassium-containing composite metal oxide B is preferably 98% by mass or more. When the composite metal oxide A generated by calcining the composition containing an alkali metal is a potassium metal-containing composite metal oxide, the potassium-containing composite metal oxide B contained in the sintered body raw material is preferably a potassium-containing composite metal oxide of the same species as the composite metal oxide A containing potassium metal that is generated by calcining the calcining raw material. The potassium-containing composite metal oxide of the same species means that the metal species of the metal oxide that constitutes the potassium composite metal oxide is the same, whether the composition is the same or different.

The average particle diameter ($D_{50}$) of the potassium-containing composite metal oxide B for the sintered body raw material is preferably 2 to 10 µm. Setting the average particle diameter of the potassium-containing composite metal oxide B for the sintered body raw material within this range can increase the strength of the metal oxide sintered body according to the present invention. In addition, the effect of preventing the composite metal oxide A generated during calcining from adhering to the metal oxide sintered body according to the present invention can be increased. In the present invention, the average particle diameter is a value of $D_{50}$ measured by adding 5 g of a sample at a concentration of 2.4% by mass to 200 g of water, then dispersing the sample with an ultrasonic homogenizer for five minutes, and measuring the dispersion liquid with a laser diffraction/scattering particle size distribution analyzer (LA-910 manufactured by HORIBA, Ltd., laser diffraction method).

Examples of the aluminum compound for the sintered body raw material include aluminum hydroxides such as α-alumina, γ-alumina, gibbsite, bayerite, and boehmite. Examples of the zirconium compound include zirconium oxide ($ZrO_2$), zirconium hydroxide, zirconium carbonate, zirconium oxychloride, zirconium oxynitrate, partially stabilized zirconia, and stabilized zirconia. Examples of the magnesium compound include magnesium oxide (MgO), magnesium hydroxide, magnesium carbonate, magnesium chloride, and magnesium sulfate. Examples of the cerium compound include cerium oxide ($CeO_2$) and cerium carbonate. Among these, α-alumina, γ-alumina, zirconium oxide, magnesium oxide, and cerium oxide are preferred in that the metal oxide sintered body according to the present invention is less deformed during sintering.

The average particle diameter ($D_{50}$) of the aluminum compound, the zirconium compound, and the magnesium compound for the sintered body raw material is preferably 1 to 10 μm. The average particle diameter ($D_{50}$) of the cerium compound for the sintered body raw material is preferably 5 μm or less, particularly preferably 0.2 to 5 μm. Setting the average particle diameters of the aluminum compound, the zirconium compound, the magnesium compound, and the cerium compound for the sintered body raw material within these ranges can increase the strength of the metal oxide sintered body according to the present invention. In addition, the effect of preventing the composite metal oxide A generated during calcining from adhering to the metal oxide sintered body according to the present invention can be increased.

The sintered body raw material can contain an organic binder, if necessary. Examples of the organic binder for the sintered body raw material include solid organic binders that thermally decompose at a temperature of 250 to 950° C., including polypropylene, polyester, polyethylene, polyacrylonitrile, polyvinyl-based polymer, polyimide, nylon-based polymer, polyurethane, and cellulose. The organic binder for the sintered body raw material may be a liquid organic binder. The solid content of the organic binder in the sintered body raw material is preferably 0.5 to 4 parts by weight, particularly preferably 1 to 3 parts by weight, with respect to 100 parts by weight of the potassium-containing composite metal oxide B, the aluminum compound, the zirconium compound, the magnesium compound, and the cerium compound, in total. Setting the content of the organic binder in the sintered body raw material within these ranges can increase the strength of the metal oxide sintered body according to the present invention. In addition, the effect of preventing the composite metal oxide A generated during calcining from adhering to the metal oxide sintered body according to the present invention can be increased.

The sintered body raw material can contain a forming aid, a dispersant, and the like, if necessary. For example, the forming aid is used to improve the forming density during forming and to enhance the releasability from a mold. The dispersant is used in order to improve dispersiveness of the raw material compound of the sintered body raw material and to improve the ease of handling granules during spray drying as described later and the drying efficiency. An example of the dispersant includes a polycarboxylic acid ammonium salt-based dispersant.

The metal oxide sintered body according to the present invention obtained by sintering the sintered body raw material has a content of K atoms ranging from 5 to 13 parts by weight in terms of $K_2O$ with respect to 100 parts by weight of the metal oxide sintered body, and a total content of Al atoms, Zr atoms, Mg atoms, and Ce atoms ranging from 15 to 70 parts by weight in terms of oxides with respect to 100 parts by weight of the metal oxide sintered body. Preferably, the metal oxide sintered body according to the present invention has a content of K atoms ranging from 7 to 13 parts by weight in terms of $K_2O$ with respect to 100 parts by weight of the metal oxide sintered body. Preferably, the metal oxide sintered body according to the present invention has a total content of Al atoms, Zr atoms, Mg atoms, and Ce atoms ranging from 25 to 48 parts by weight in terms of oxides with respect to 100 parts by weight of the metal oxide sintered body according to the present invention.

The Vickers hardness of the metal oxide sintered body according to the present invention is preferably 260 or more.

The metal oxide sintered body according to the present invention preferably has an amount of blast abrasion of 18% or less.

In the metal oxide sintered body according to the present invention, the content of K atoms and the total content of Al atoms, Zr atoms, Mg atoms, and Ce atoms fall within particular ranges. In other words, the metal oxide sintered body according to the present invention is a sintered body in which a potassium-containing composite metal oxide and an oxide of one or more kinds selected from Al, Zr, Mg, and Ce or a composite metal oxide of two or more kinds selected from Al, Zr, Mg, and Ce are sintered at particular contents.

The amounts of the potassium-containing composite metal oxide B and one or more kinds of compounds selected from an aluminum compound, a zirconium compound, a magnesium compound, and a cerium compound to be contained in the sintered body raw material are adjusted such that the contents of K atoms, Al atoms, Zr atoms, Mg atoms, and Ce atoms in the metal oxide sintered body according to the present invention fall within the ranges above.

An example of a method of producing the metal oxide component according to the present invention is shown below. It is noted that the method of producing the metal oxide component according to the present invention is shown below only by way of example, and the metal oxide component according to the present invention is not limited to the one produced in accordance with the production method below.

First of all, a production raw material for producing the metal oxide component according to the present invention (hereinafter simply referred to as the production raw material), namely, the potassium-containing composite metal oxide B and at least one kind selected from an aluminum compound, a zirconium compound, a magnesium compound, and a cerium compound are prepared.

The production raw material, namely, the potassium-containing composite metal oxide B, at least one kind selected from an aluminum compound, a zirconium compound, a magnesium compound, and a cerium compound, and, if necessary, an organic binder, a forming aid, a dispersant, and the like are pulverized and mixed by known means such as a mixer and a ball mill to obtain a sintered body raw material. The pulverization and mixing may be either dry or wet.

When the production raw material is wet pulverized and mixed, a solvent such as water and alcohol can be used, and pulverization and mixing is performed until a uniform slurry state is achieved. The slurry obtained by wet pulverization and mixing is then dried. In general, the slurry is dried using a spray drier. The drying using a spray drier refers to a drying method in which slurry is atomized into hot air to obtain dry powder. Examples of the atomization method include a rotary disc method, a pressurized nozzle method, and a two-fluid nozzle method. In general, in drying slurry using a spray drier, the slurry is sprayed into hot air at temperatures of 200 to 250° C. to obtain particles having an average particle diameter of 10 to 500 μm. Then, in order to enhance the filling ability during forming, preferably, particles having an average particle diameter of 20 to 200 μm are obtained.

The sintered body raw material obtained by pulverizing and mixing the production raw material is then put into a mold and compressed using a uniaxial pressing machine or a CIP (cold isostatic pressing) machine to obtain a formed body of the sintered body raw material.

When the production raw material is wet pulverized and mixed, the slurry obtained by pulverization and mixing can be formed into a sheet having a thickness of 0.1 to 200 mm by casting, extrusion, and doctor blade forming, and then dried to obtain a formed body of the sintered body raw material. A formed body of the sintered body raw material can be obtained on a substrate by applying the slurry on a heat-resistant substrate by a well-known method.

When all the raw material compounds in the sintered body raw material are metal oxides, the metal oxide component according to the present invention is obtained by heating the formed body of the sintered body raw material to sinter the metal oxides. When the raw material compounds in the sintered body raw material are not metal oxides, each raw material compound in the sintered body raw material is oxidized into a metal oxide, and the generated metal oxide is then sintered to obtain the metal oxide component according to the present invention. The sintering temperature for heating and sintering the sintered body raw material is higher than the calcining temperature for calcining the calcining raw material and is selected as appropriate. The sintering temperature is preferably equal to or higher than a temperature 50° C. lower than the melting point of the potassium-containing composite metal oxide B, and particularly preferably equal to or higher than a temperature 30° C. lower than the melting point of the potassium-containing composite metal oxide B. For example, when the potassium-containing composite metal oxide B is $K_2O \cdot n\,(TiO_2)$ (n=6), the sintering temperature is 1300° C. or higher, preferably 1320° C. or higher, in that the hardness, abrasion resistance, and thermal shock resistance of the metal oxide component can be increased. In view of cost efficiency and heating methods, the sintering temperature for the formed body of the sintered body raw material is preferably 1550° C. or lower. When even one of the raw material compounds in the sintered body raw material is not a metal oxide, the atmosphere in which the production raw material is sintered is an oxidizing atmosphere such as oxygen gas or air. When all the raw material compounds in the sintered body raw material are metal oxides, either an oxidizing atmosphere, such as oxygen gas or air, or an inert atmosphere, such as nitrogen gas or argon gas, may be used. The temperature increase rate, the sintering time, and the temperature decrease rate in heating the sintered body raw material are selected such that the temperature increase rate, the sintering time, and the temperature decrease rate do not cause deformation, depending on the shape and size of the metal oxide sintered body according to the present invention. In general, the temperature is increased at a rate of 20 to 100° C./hour, held at 400 to 500° C. for one to five hours, then increased at a rate of 20 to 100° C./hour until the sintering temperature (for example, 1100 to 1550° C.) is reached, held at the sintering temperature for two to six hours, and then decreased at a rate of 10 to 200° C./hour. The temperature equal to or higher than a temperature 50° C. lower than the melting point of the potassium-containing composite metal oxide B is described as follows. For example, when the melting point of the potassium-containing composite metal oxide B is 1350° C., the temperature 50° C. lower than the melting point of the potassium-containing composite metal oxide B is 1300° C., so that the temperature equal to or higher than a temperature 50° C. lower than the melting point of the potassium-containing composite metal oxide B refers to a temperature equal to or higher than 1300° C.

In the method of producing a composite metal oxide according to the present invention, a composition containing an alkali metal is calcined with the metal oxide component according to the present invention being arranged at a part of a mount in contact with the composition containing an alkali metal. That is, in the method of producing a composite metal oxide according to the present invention, a composition containing an alkali metal is calcined while being arranged on a mount a part of which in contact with the composition containing an alkali metal is formed of the metal oxide component according to the present invention.

The method of arranging and calcining a composition containing an alkali metal (calcining raw material) on a mount a part of which in contact with the calcining raw material is formed of the metal oxide component according to the present invention, is not limited. Examples of the method include:

(i) the calcining raw material is calcined in a crucible, a sagger, a setter, a reaction tube, or the like formed of the metal oxide component according to the present invention;

(ii) the calcining raw material is calcined in a crucible, a sagger, a setter, a reaction tube, or the like that is coated with the metal oxide component according to the present invention;

(iii) the calcining raw material is calcined in a reaction furnace having an inner wall formed of the metal oxide component according to the present invention at a part in contact with the calcining raw material;

(iv) the calcining raw material is calcined while being placed on a setter formed of the metal oxide component according to the present invention that is covered with sintering sand;

(v) the calcining raw material is calcined while being placed on a setter covered with sintering sand formed of the metal oxide component according to the present invention; and (vi) the formed body of the calcining raw material is calcined while being suspended from a tool (for example, a pin) formed of the metal oxide component according to the present invention. As an embodiment of the method (iii) above, the calcining raw material is calcined in a rotary kiln having an inner wall formed of the metal oxide component according to the present invention in a retort.

The rotary kiln according to the present invention includes a retort whose inner wall contains the metal oxide sintered body according to the present invention. A heat-resistant metal for a heat-resistant metal cylindrical retort of an externally heated rotary kiln is dependent on the calcining temperature. Examples thereof include a Cr—Al—Fe alloy (for example, Cr 22 (at %)-Al 5.8 (at %) to 4.3 (at %)-Fe (the balance)) and a nickel-chromium alloy (for example, Cr 20 (at %)-Ni (at %), Cr 15 (at %)-Ni 60 (at %)-Fe 25 (at %)), when the calcining temperature is 1000° C. or higher.

In the method of producing a composite metal oxide according to the present invention, to calcine a composition containing an alkali metal, a part of a mount in contact with the composition containing an alkali metal is made of the metal oxide component according to the present invention, thereby reducing the reaction between the metal oxide component according to the present invention and the calcined product and reducing adhesion of the generated composite oxide A to the metal oxide component according to the present invention. The composite metal oxide A can thus be obtained with increased yields. In the method of producing a composite metal oxide according to the present invention, the metal oxide component according to the present invention highly resistant to thermal shock is used, so that even when calcining is repeated, for example, calcining is performed repeatedly about 20 times, the metal oxide component according to the present invention does not become cracked after calcining. Based on these, the method of producing a composite metal oxide according to the present invention can reduce the production costs for the composite metal oxide A.

In the method of producing a composite metal oxide according to the present invention, the metal oxide sintered body according to the present invention is arranged as an inner wall of a heat-resistant metal cylindrical retort of an externally heated rotary kiln, so that the calcining raw material can be successively calcined. Accordingly, the method of producing a composite metal oxide according to the present invention can increase the production efficiency of the composite metal oxide A.

In the following, the present invention will be described more specifically with Examples. The Examples, however, are shown only by way of example and do not limit the present invention.

EXAMPLES

Method of Measuring Average Particle Diameter

The average particle diameter was measured by adding 5 g of a sample at a concentration of 2.4% by mass to 200 g of water, then dispersing the sample with an ultrasonic homogenizer for five minutes, and measuring the dispersion liquid with a laser diffraction/scattering particle size distribution analyzer (LA-910 manufactured by HORIBA, Ltd., laser diffraction method).

(X-Ray Powder Diffraction)

The crystal form of the sample was specified under the following conditions using the apparatus below.

X-ray diffractometer: RINT/Ultima+ (manufactured by Rigaku Corporation)
X-ray tube: Cu
Tube voltage and tube current: 40 kV, 20 mA
Slit: 1 degree with DS-SS, RS of 0.3 mm
Scan speed: 5°/min
Measurement range: 20° to 40°
Monochromator: graphite
Measurement interval: 0.02 degrees
Count method: fixed time method (Method of Measuring Density of Sintered Body)

The density of the sintered body was measured by the Archimedes method.

(Contents of K atoms, Al atoms, Zr atoms, Mg atoms, and Ce atoms)

The contents of K atoms, Al atoms, Zr atoms, Mg atoms, and Ce atoms in the metal oxide sintered body were measured by the ICP method. The obtained content of K atoms was converted into a content expressed in terms of $K_2O$, the obtained content of Al atoms into a content expressed in terms of $Al_2O_3$, the obtained content of Zr atoms into a content expressed in terms of $ZrO_2$, the obtained content of Mg atoms into a content expressed in terms of MgO, and the obtained content of Ce atoms into a content expressed in terms of $CeO_2$.

(Vickers Hardness Hv)

A test piece was sampled from each metal oxide sintered body and measured using a Vickers hardness tester (AKASHI CORPORATION, AVK-A).

(Amount of Blast Abrasion)

Alumina 0.3-mm grains were blown over the surface of the test piece sampled from each metal oxide sintered body, at a pressure of 0.5 MPa for one minute, and the weight reduction ratio due to impact of blowing was measured. The amount of blast abrasion was calculated by an expression ($\Delta W/Wa$)×100(%) where Wa (g) is the weight before blast and $\Delta W$ (g) is the amount of abrasion (the amount of weight reduction) after blast.

Example 1

Production of Metal Oxide Sintered Body a1

52.5 kg of $K_2O.6$ ($TiO_2$) powder (TOFIX-SN manufactured by Toho Material Co., Ltd.) (average particle diameter: 6.5 μm), 21 kg of aluminum oxide ($Al_2O_3$, A-21 manufactured by Sumitomo Chemical Co., Ltd.), 735 g of polycarboxylic acid ammonium salt-based dispersant (KE-511 manufactured by GOO CHEMICAL CO., LTD.), and 37 liters of water were mixed for 15 minutes. The mixed powder was spray-granulated with a spray drier (Model: FOC 20 manufactured by OHKAWARA KAKOHKI CO., LTD.) to obtain a granulated powder d1. The conditions were a hot air temperature of 250° C., an exhaust temperature of 100° C., and an atomizer rotation speed of 12000 rpm.

200 g of the obtained granulated powder (d1) was formed into a 100-mm cube at a contact pressure of 1000 kg/cm². The obtained formed body was then sintered in the air with a temperature increased at 50° C./hour, at 1350° C. for two hours, and decreased at 50° C./hour, resulting in a metal oxide sintered body a1. In the metal oxide sintered body a1, the content of K atoms was 11 parts by weight in terms of $K_2O$ with respect to 100 parts by weight of the metal oxide sintered body (a1), and the content of Al atoms was 31 parts by weight in terms of $Al_2O_3$ with respect to 100 parts by weight of the metal oxide sintered body (a1). The Vickers hardness Hv of the metal oxide sintered body a1 was 310, and the amount of blast abrasion thereof was 10%.

Example 2

291.25 g of 99.9% pure titanium oxide powder (manufactured by TOHO TITANIUM CO., LTD., the rutilation ratio of 90%) and 108.75 g of 99.0% pure lithium carbonate powder (manufactured by Wako Pure Chemical Industries, Ltd.) were measured in a glove box in the air atmosphere, and a raw material with a Li/Ti ratio of 0.80 was sampled. The average particle diameters of the sampled powders were both 0.1 to 10 μm. The sampled titanium oxide powder and lithium carbonated powder were charged into a rocking mixer and mixed over two hours to obtain a calcining raw material powder b1. 100 g of the obtained calcining raw material powder b1 was taken and charged into a titanium mold having a diameter of 50 mm to produce a plurality of formed bodies b1 of the calcining raw material at a pressure of 0.5 tons/cm². The formed body b1 of the calcining raw material was placed on the metal oxide sintered body a1 and inserted into a heating furnace with a temperature increased to 700° C. at 4° C./min in average and held at 700° C. for 4.5 hours to pre-calcinate each formed body b1 of the calcining raw material. During pre-calcination, oxygen was continuously supplied to the heating furnace at a flow rate of 0.08 to 0.1 Nl/min.

Each formed body b1 of the calcining raw material after pre-calcination was taken out from the heating furnace and pulverized into particle diameters of 4 to 12 μm using an agate mortar in the glove box in the air atmosphere to obtain a pulverized powder b2 of the pre-calcinated product of the calcining raw material.

100 g of the pulverized powder b2 of the pre-calcinated product of the calcining raw material was charged into a titanium mold having a diameter of 50 mm and formed at a pressure of 0.5 tons/cm² to produce a formed body b2 of the pre-calcinated product of the calcining raw material. The formed body b2 of the pre-calcinated product of the calcining raw material was placed on the metal oxide sintered body a1 and inserted into a heating furnace to perform calcining at a temperature of 800° C. held for 4.5 hours. During calcining, oxygen was continuously supplied to the heating furnace at a flow rate of 0.08 to 0.1 Nl/min.

The formed body b2 of the calcinated product of the calcining raw material after calcining was pulverized using an agate mortar in a glove box in the air atmosphere to obtain powder of the calcined product. The obtained powder of the calcined product was examined by X-ray powder diffraction and found to be almost single-phase $Li_4Ti_5O_{12}$.

The appearance of the metal oxide sintered body a1 after calcining was observed, and it was found that there was no adhesion to the metal oxide sintered body a1 and the metal oxide sintered body a1 was not cracked.

Example 3

The calcining of the alkali metal-containing composite metal oxide of Example 2 was repeatedly performed 20 times. The appearance of the metal oxide sintered body a1 after the 20th calcining was observed, and it was found that there was no adhesion to the metal oxide sintered body a1 and the metal oxide sintered body a1 was not cracked.

Example 4

8.7 kg of titanium oxide aggregate with an average particle diameter of 0.8 mm, 2.7 kg of powder potassium carbonate, 447 g of titanium powder, and 897 g of wood chips were charged into a vibration mill (manufactured by CHUO KAKOHKI CO., LTD., under the trade name of FV20) charged with 303 kg of SS cylindrical rod media with a diameter of 19 mm, a length of 640 mm, and 1420 g/rod. In addition, 65 g of methanol was added thereto, and pulverization was performed with an amplitude of 8 mm, a vibration frequency of 1000/min, and an internal temperature of 80° C. for 15 minutes to obtain a calcining raw material c1. 100 g of the calcining raw material c1 was placed on the metal oxide sintered body a1 and put into an electric furnace with a temperature increased from room temperature to 1250° C. over 12 hours, and calcining was thereafter performed for 5.5 hours in a range of 1200 to 1300° C. After calcining, the temperature was decreased to room temperature over 13 hours, and the calcined product was taken out. The resultant calcined product was examined by X-ray powder diffraction and found to be almost single-phase $K_2O.6TiO_2$.

The appearance of the metal oxide sintered body a1 after calcining was observed, and it was found that there was no adhesion to the metal oxide sintered body a1 and the metal oxide sintered body a1 was not cracked.

Example 5

The calcining of the alkali metal-containing composite metal oxide of Example 4 was repeatedly performed 20 times. The appearance of the metal oxide sintered body a1 after the 20th calcining was observed, and it was found that there was no adhesion to the metal oxide sintered body a1 and the metal oxide sintered body a1 was not cracked.

Example 6

Production of Metal Oxide Sintered Body a2

The granulated powder d1 obtained by the same method as in Example 1 was formed into a cylinder having an outer diameter of 250 mm, an inner diameter of 230 mm, and a length of 500 mm, at a contact pressure of 1000 kg/cm². The resultant formed body was then sintered in the air with a temperature increased to 1350° C. at 50° C./hour, held at 1350° C. for two hours, and decreased at 50° C./hour to obtain a metal oxide sintered body a2. In the metal oxide sintered body a2, the content of K atoms was 11 parts by weight in terms of $K_2O$ with respect to 100 parts by weight of the metal oxide sintered body (a2), and the content of Al atoms was 31 parts by weight in terms of $Al_2O_3$ with respect to 100 parts by weight of the metal oxide sintered body (a2). The Vickers hardness Hv of the metal oxide sintered body a2 was 350, and the amount of blast abrasion thereof was 8%.

The outer periphery of the resultant metal oxide sintered body a2 was ground such that the outer diameter was adjusted to 195 mm. Six sets were fixed in the inside of a Cr—Al—Fe alloy having an inner diameter of 210 mm and a length of 3 m to produce a retort of an externally heated rotary kiln.

Example 7

A calcining raw material c1 obtained by the same method as in Example 4 was calcined at calcining temperatures of 1050 to 1150° C. for a duration of 1.0 to 1.5 hours with an externally heated rotary kiln that is provided with the retort of the external-heating type rotary kiln produced in Example 6. The powder of the calcined product was examined by X-ray powder diffraction and found to be almost single-phase $K_2O.6TiO_2$.

After the calcining raw material c1 was calcined continuously for 1000 hours, the inside of the retort of the externally heated rotary kiln was examined, and it was found that there was no adhesion to the metal oxide sintered body a2 and the metal oxide sintered body a2 was not cracked.

Comparative Example 1

Production of Metal Oxide Sintered Body a3

A metal oxide sintered body a3 was obtained by performing the same method as in Example 1 except that 52.5 kg of $K_2O.6TiO_2$ powder (TOFIX-SN manufactured by Toho Material Co., Ltd.) (the average particle diameter: 6.5 μm) was replaced by 20 kg of $K_2O.6TiO_2$ powder (TOFIX-SN manufactured by Toho Material Co., Ltd.) (the average particle diameter: 6.5 μm) and that 21 kg of aluminum oxide ($Al_2O_3$, A-21 manufactured by Sumitomo Chemical Co., Ltd.) was replaced by 53.5 kg of aluminum oxide ($Al_2O_3$, A-21 manufactured by Sumitomo Chemical Co., Ltd.). In the metal oxide sintered body a3, the content of K atoms was 3 parts by weight in terms of $K_2O$ with respect to 100 parts by weight of the metal oxide sintered body (a3), and the content of Al atoms was 74 parts by weight in terms of $Al_2O_3$ with respect to 100 parts by weight of the metal oxide sintered body (a3). The Vickers hardness Hv of the metal oxide sintered body a3 was 250, and the amount of blast abrasion thereof was 20%.

Comparative Example 2

The calcining of the alkali metal-containing composite metal oxide was repeatedly performed in the same manner as in Example 4 except that the metal oxide sintered body a1 was replaced by the metal oxide sintered body a3. Adhesion to the metal oxide sintered body a3 was observed after the first calcining, and cracks were observed in the metal oxide sintered body a3 after the third calcining.

Example 8

Production of Metal Oxide Sintered Body a4

A metal oxide sintered body a4 was obtained by performing the same method as in Example 1 except that 52.5 kg of $K_2O \cdot 6TiO_2$ powder (TOFIX-SN manufactured by Toho Material Co., Ltd.) (the average particle diameter: 6.5 μm) was replaced by 35 kg of $K_2O \cdot 6TiO_2$ powder (TOFIX-SN manufactured by Toho Material Co., Ltd.) (the average particle diameter: 6.5 μm) and that 21 kg of aluminum oxide ($Al_2O_3$, A-21 manufactured by Sumitomo Chemical Co., Ltd.) was replaced by 38.5 kg of aluminum oxide ($Al_2O_3$, A-21 manufactured by Sumitomo Chemical Co., Ltd.). In the metal oxide sintered body a4, the content of K atoms was 8 parts by weight in terms of $K_2O$ with respect to 100 parts by weight of the metal oxide sintered body (a4), and the content of Al atoms was 46 parts by weight in terms of $Al_2O_3$ with respect to 100 parts by weight of the metal oxide sintered body (a4). The Vickers hardness Hv of the metal oxide sintered body a4 was 280, and the amount of blast abrasion thereof was 15%.

Example 9

The calcining of the alkali metal-containing composite metal oxide was repeatedly performed in the same manner as in Example 2 except that the metal oxide sintered body a1 was replaced by the metal oxide sintered body a4.

The appearance of the metal oxide sintered body a4 after the 20th calcining was observed, and it was found that there was no adhesion to the metal oxide sintered body a4 and the metal oxide sintered body a4 was not cracked.

Example 10

The calcining of the alkali metal-containing composite metal oxide was repeatedly performed in the same manner as in Example 4 except that the metal oxide sintered body a1 was replaced by the metal oxide sintered body a4.

The appearance of the metal oxide sintered body a4 after the 20th calcining was observed, and it was found that there was no adhesion to the metal oxide sintered body a4 and the metal oxide sintered body a4 was not cracked.

Comparative Example 3

Production of Metal Oxide Sintered Body a5

A metal oxide sintered body a5 was obtained by performing the same method as in Example 1 except that 52.5 kg of $K_2O \cdot 6TiO_2$ powder (TOFIX-SN manufactured by Toho Material Co., Ltd.) (the average particle diameter: 6.5 μm) was replaced by 68.5 kg of $K_2O \cdot 6TiO_2$ powder (TOFIX-SN manufactured by Toho Material Co., Ltd.) (the average particle diameter: 6.5 μm) and that 21 kg of aluminum oxide ($Al_2O_3$, A-21 manufactured by Sumitomo Chemical Co., Ltd.) was replaced by 5 kg of aluminum oxide ($Al_2O_3$, A-21 manufactured by Sumitomo Chemical Co., Ltd.). In the metal oxide sintered body a5, the content of K atoms was 14 parts by weight in terms of $K_2O$ with respect to 100 parts by weight of the metal oxide sintered body (a5), and the content of Al atoms was 6 parts by weight in terms of $Al_2O_3$ with respect to 100 parts by weight of the metal oxide sintered body (a5). The Vickers hardness Hv of the metal oxide sintered body a5 was 370, and the amount of blast abrasion thereof was 5%.

Comparative Example 4

The calcining of the alkali metal-containing composite metal oxide was repeatedly performed in the same manner as in Example 4 except that the metal oxide sintered body a1 was replaced by the metal oxide sintered body a5. Adhesion to the metal oxide sintered body a5 was observed after the first calcining, and cracks were observed in the metal oxide sintered body a5 after the tenth calcining.

Example 11

Production of Metal Oxide Sintered Body a6

A metal oxide sintered body a6 was obtained by performing the same method as in Example 1 except that sintering at 1350° C. for two hours was replaced by sintering at 1200° C. for two hours. In the metal oxide sintered body a6, the content of K atoms was 11 parts by weight in terms of $K_2O$ with respect to 100 parts by weight of the metal oxide sintered body (a6), and the content of Al atoms was 29 parts by weight in terms of $Al_2O_3$ with respect to 100 parts by weight of the metal oxide sintered body (a6). The Vickers hardness Hv of the metal oxide sintered body a6 was 260, and the amount of blast abrasion thereof was 17%.

Example 12

The calcining of the alkali metal-containing composite metal oxide was repeatedly performed in the same manner as in Example 2 except that the metal oxide sintered body a1 was replaced by the metal oxide sintered body a6.

The appearance of the metal oxide sintered body a6 after the tenth calcining was observed, and it was found that there was no adhesion to the metal oxide sintered body a6 and the metal oxide sintered body a6 was not cracked. However, when the appearance of the metal oxide sintered body a6 after the 20th calcining was observed, it was found that the metal oxide sintered body a6 was cracked although there was no adhesion to the metal oxide sintered body a6.

Example 13

The calcining of the alkali metal-containing composite metal oxide was repeatedly performed in the same manner as in Example 4 except that the metal oxide sintered body a1 was replaced by the metal oxide sintered body a6.

The appearance of the metal oxide sintered body a6 after the tenth calcining was observed, and it was found that there was no adhesion to the metal oxide sintered body a6 and the metal oxide sintered body a6 was not cracked. However, when the appearance of the metal oxide sintered body a6 after the 20th calcining was observed, it was found that the metal oxide sintered body a6 was cracked although there was no adhesion to the metal oxide sintered body a6.

Comparative Example 5

Production of Metal Oxide Sintered Body a7

A metal oxide sintered body a7 was obtained by performing the same method as in Example 1 except that 52.5 kg of $K_2O \cdot 6TiO_2$ powder (TOFIX-SN manufactured by Toho Material Co., Ltd.) (the average particle diameter: 6.5 μm) and 21 kg of aluminum oxide ($Al_2O_3$, A-21 manufactured by Sumitomo Chemical Co., Ltd.) were replaced by 73.5 kg of aluminum oxide ($Al_2O_3$, A-21 manufactured by Sumitomo Chemical Co., Ltd.) (that is, the amount of aluminum oxide used was 73.5 kg without using $K_2O \cdot 6TiO_2$ powder).

In the metal oxide sintered body a7, the content of Al atoms was 100 parts by weight in terms of $Al_2O_3$ with respect to 100 parts by weight of the metal oxide sintered body (a7). The Vickers hardness Hv of the metal oxide sintered body a7 was 220, and the amount of blast abrasion thereof was 25%.

Comparative Example 6

The calcining of the alkali metal-containing composite metal oxide was repeatedly performed in the same manner as in Example 4 except that the metal oxide sintered body a1 was replaced by the metal oxide sintered body a7.

Adhesion to the metal oxide sintered body a7 was observed after the first calcining, and cracks were also observed in the metal oxide sintered body a7.

Example 14

Production of Metal Oxide Sintered Body a8

A metal oxide sintered body a8 was obtained by performing the same method as in Example 1 except that 21 kg of aluminum oxide ($Al_2O_3$, A-21 manufactured by Sumitomo Chemical Co., Ltd.) was replaced by 21 kg of zirconium oxide ($ZrO_2$, TMZ manufactured by Daiichi Kigenso Kagaku Kogyo Co., Ltd.). In the metal oxide sintered body a8, the content of K atoms was 11 parts by weight in terms of $K_2O$ with respect to 100 parts by weight of the metal oxide sintered body (a8), and the content of Zr atoms was 31 parts by weight in terms of $ZrO_2$ with respect to 100 parts by weight of the metal oxide sintered body (a8). The Vickers hardness Hv of the metal oxide sintered body a8 was 400, and the amount of blast abrasion thereof was 3%.

Example 15

The calcining of the alkali metal-containing composite metal oxide was repeatedly performed in the same manner as in Example 4 except that the metal oxide sintered body a1 was replaced by the metal oxide sintered body a8.

The appearance of the metal oxide sintered body a8 after the 20th calcining was observed, and it was found that there was no adhesion to the metal oxide sintered body a8 and the metal oxide sintered body a8 was not cracked.

Example 16

Production of Metal Oxide Sintered Body a9

A metal oxide sintered body a9 was obtained by performing the same method as in Example 1 except that 21 kg of aluminum oxide ($Al_2O_3$, A-21 manufactured by Sumitomo Chemical Co., Ltd.) was replaced by 21 kg of cerium oxide ($CeO_2$, $CeO_2$-PZ250 manufactured by TREIBACHER INDUSTRIE AG). In the metal oxide sintered body a9, the content of K atoms was 11 parts by weight in terms of $K_2O$ with respect to 100 parts by weight of the metal oxide sintered body (a9), and the content of Ce atoms was 31 parts by weight in terms of $CeO_2$ with respect to 100 parts by weight of the metal oxide sintered body (a9). The Vickers hardness Hv of the metal oxide sintered body a9 was 320, and the amount of blast abrasion thereof was 10%.

Example 18

The calcining of the alkali metal-containing composite metal oxide was repeatedly performed in the same manner as in Example 4 except that the metal oxide sintered body a1 was replaced by the metal oxide sintered body a9.

The appearance of the metal oxide sintered body a9 after the 20th calcining was observed, and it was found that there was no adhesion to the metal oxide sintered body a9 and the metal oxide sintered body a9 was not cracked.

Example 19

Production of Metal Oxide Sintered Body a10

A metal oxide sintered body a10 was obtained by performing the same method as in Example 1 except that 21 kg of aluminum oxide ($Al_2O_3$, A-21 manufactured by Sumitomo Chemical Co., Ltd.) was replaced by 21 kg of magnesium oxide (MgO, PUREMAG FNM-G manufactured by Tateho Chemical Industries Co., Ltd.). In the metal oxide sintered body a10, the content of K atoms was 11 parts by weight in terms of $K_2O$ with respect to 100 parts by weight of the metal oxide sintered body (a10), and the content of Mg atoms was 31 parts by weight in terms of MgO with respect to 100 parts by weight of the metal oxide sintered body (a10). The Vickers hardness Hv of the metal oxide sintered body a10 was 310, and the amount of blast abrasion thereof was 12%.

Example 20

The calcining of the alkali metal-containing composite metal oxide was repeatedly performed in the same manner as in Example 4 except that the metal oxide sintered body a1 was replaced by the metal oxide sintered body a10.

The appearance of the metal oxide sintered body a10 after the 20th calcining was observed, and it was found that there was no adhesion to the metal oxide sintered body a10 and the metal oxide sintered body a10 was not cracked.

Example 21

A calcining raw material c1 obtained by the same method as in Example 4 was calcined in the rotary kiln of Example 7 with a rotary kiln inlet temperature of 800° C., the highest temperature (the central part of the rotary kiln) of 1200° C., a total duration of 50 minutes, and a duration in the highest temperature range of 5 minutes. The powder of the calcined product was observed by X-ray powder diffraction and found to be almost single-phase $K_2O \cdot 6TiO_2$.

After calcining of the calcining raw material c1 was performed continuously for 1000 hours thereafter, the inside of the retort of the externally heated rotary kiln was examined. It was then found that there was no adhesion to the metal oxide sintered body a2 and the metal oxide sintered body a2 was not cracked.

INDUSTRIAL APPLICABILITY

The present invention can reduce the production costs for a composite metal oxide containing an alkali metal and, in addition, can produce a composite metal oxide containing an alkali metal with increased production efficiency, thereby providing a composite metal oxide containing an alkali metal cheaply.

The invention claimed is:

1. A method of producing $K_2O \cdot n(TiO_2)$ (n=4 to 8), the method comprising:
   to calcine a composition containing an alkali metal and obtain $K_2O \cdot n(TiO_2)$ (n=4 to 8), calcining the composition while being arranged on a mount a part of which in contact with the composition is formed of a metal oxide component,
   wherein the metal oxide component has a content of K atoms ranging from 5 to 13 parts by weight in terms of $K_2O$ with respect to 100 parts by weight of the metal oxide component in terms of oxides, and a total content of Al atoms, Zr atoms, Mg atoms, and Ce atoms ranging from 15 to 70 parts by weight in terms of oxides with respect to 100 parts by weight of the metal oxide component in terms of oxides.

2. The method of producing a composite metal oxide according to claim 1, wherein the metal oxide component has a Vickers hardness of 260 or more.

3. The method of producing a composite metal oxide according to claim 2, wherein the metal oxide component has an amount of blast abrasion of 18% or less.

4. The method of producing a composite metal oxide according to claim 1, wherein the metal oxide component is a metal oxide sintered body obtained by sintering a sintered body raw material that contains a potassium-containing composite metal oxide and one or more kinds of compounds selected from an aluminum compound, a zirconium compound, a magnesium compound, and a cerium compound.

5. The method of producing a composite metal oxide according to claim 2, wherein the metal oxide component is a metal oxide sintered body obtained by sintering a sintered body raw material that contains a potassium-containing composite metal oxide and one or more kinds of compounds selected from an aluminum compound, a zirconium compound, a magnesium compound, and a cerium compound.

6. The method of producing a composite metal oxide according to claim 3, wherein the metal oxide component is a metal oxide sintered body obtained by sintering a sintered body raw material that contains a potassium-containing composite metal oxide and one or more kinds of compounds selected from an aluminum compound, a zirconium compound, a magnesium compound, and a cerium compound.

* * * * *